Feb. 3, 1970  R. L. KROTTINGER ET AL  3,493,529
POLYMER-CEMENT COMPOSITION AND USE THEREFOR
Filed May 6, 1966  2 Sheets-Sheet 2

INVENTORS.
Samuel A. Pence
Louis H. Eilers
Ralph L. Krottinger

ATTORNEY

United States Patent Office 3,493,529
Patented Feb. 3, 1970

3,493,529
POLYMER-CEMENT COMPOSITION AND
USE THEREFOR
Ralph L. Krottinger, Oklahoma City, and Samuel A. Pence and Louis H. Eilers, Tulsa, Okla., assignors to The Dow Chemical Company, Midland, Mich., a corporation of Delaware
Filed May 6, 1966, Ser. No. 548,134
Int. Cl. C08f 45/04, 29/00
U.S. Cl. 260—29.6
10 Claims

ABSTRACT OF THE DISCLOSURE

An easily emplaced and located sealant material, especially adapted for use in underground operations including sealing off of fluids in wells, which is compatible with either a polymer slurry or an hydraulic cement slurry which may be in contact therewith during the setting period which comprises an acrylamide polymer, an hydraulic cement, an alkylene glycol, and water.

Figure 1:
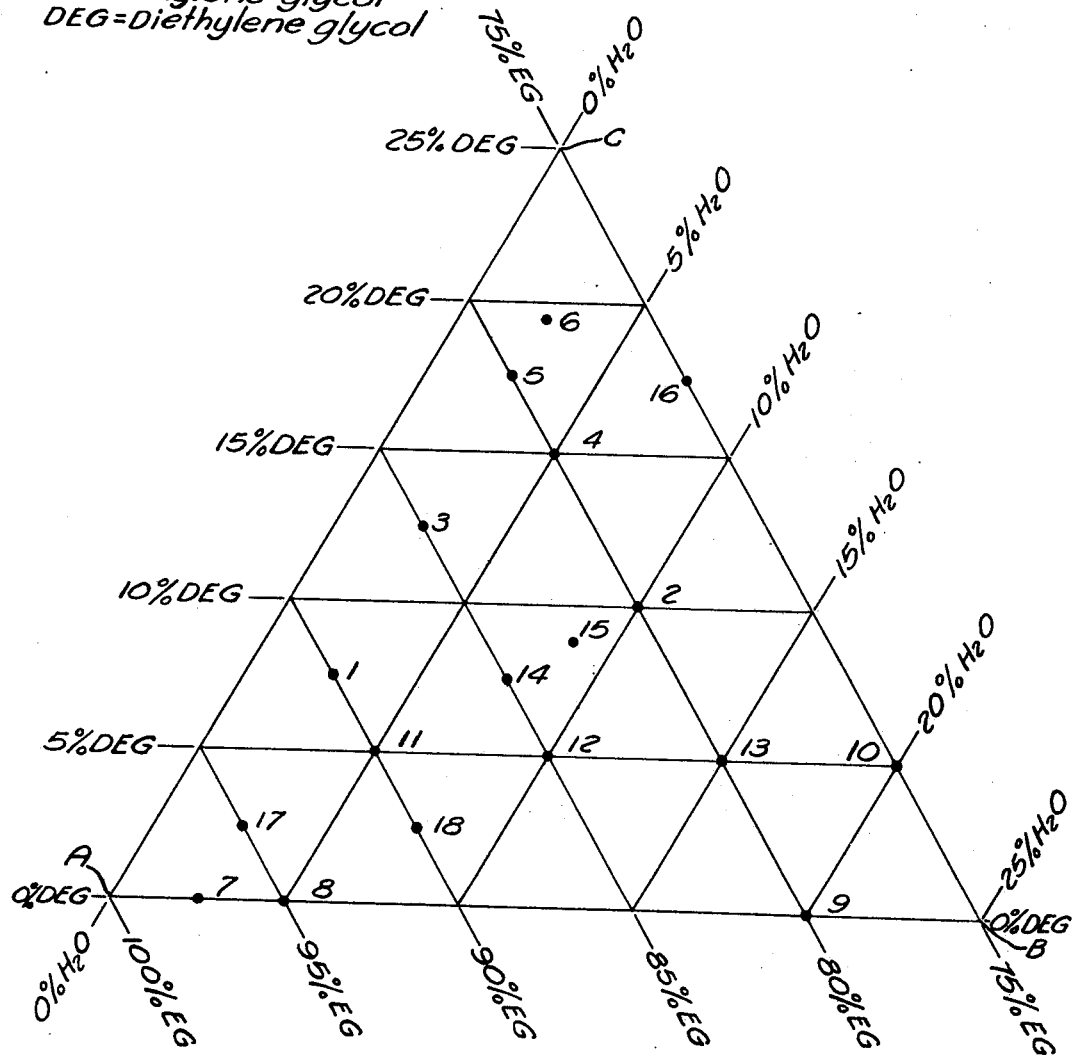

The invention is an improvement in the art of the preparation and use of sealing or plugging compositions.

Various settable or hardenable compositions which are sufficiently fluid to permit time for them to be poured, pumped, or otherwise moved by pressure or by a conveyor system from a place of preparation to the location where sealing or plugging is desired to be done have long been widely used.

An important use of such composition is in underground operations associated with wellbores and shafts for the purpose of inhibiting the passage of water.

Among the more extensively used compositions for this purpose are aqueous hydraulic cement compositions particularly those employing Portland cement and expansive cement and resinous compositions, e.g. phenol-formaldehyde, epoxy, and the like. More recently water shut-off has been effectuated in a highly effective manner by use of aqueous polymer-brine mixtures as described in application S.N. 371,665, filed June 1, 1964, now U.S. Patent 3,306,870 or by the use of polymer-glycol compositions as described in application S.N. 486,530, filed Sept. 10, 1965.

For some purposes neither an aqueous hydraulic cement nor a brine or glycol-polymer composition is fully satisfactory. Among such purposes are certain grouting and sealing operations performed underground, such as in leveling, raising, or repairing paving. In sealing off fluids about tunnels, shaft liners, well casing, and the like, it is often desirable to effectuate a good seal which is more economical than that provided by the brine- or glycol-acrylamide type polymer.

There is need for a plugging composition which combines the properties of hydraulic cement and aqueous and/or glycolic polymer compositions. The cement lends strength and usually prevents a gusher type brine or water intrusion. The brine-polymer or glycol-polymer gelled composition expands in place and thereby forms and maintains a tight strong seal against seepage around the cement. In general, the two types of compositions supplement each other.

Occasions arise wherein it is desirable that an aqueous hydraulic cement slurry and either a polymer-brine or a polymer-glycol liquid composition be emplaced immediately adjacent to each other, e.g. when both are used supplementary to each other to effectuate a water shut-off in a geologic formation. Illustrative of such occasions are sealing between the face of a borehole wall and the outside of a large casing or shaft liner as for example those employed for lowering and raising personnel and machinery in underground operations such as those carried out when nuclear tests are conducted underground.

In the use of an hydraulic cement slurry adjacent to a polymer slurry, due to the lack of compatibility between the two materials, the result thereof has been an intermingling of some of the cement slurry with the polymer slurry at the interface of the two slurries creating a zone of weakness which, after set of the slurries to solids, is relatively easily traversed or penetrated by liquids such as water and brines.

Attempts to prevent this zone of weakness have included the use of mechanical separators or the use of a liquid which would constitute a buffer zone until the two slurries had solidified. None of these attempts has proved to be generally acceptable.

The need has continued for an economical highly effective sealant material which has the combined strength properties which result from a polymer network or matrix and an hydraulic cement matrix and method of use thereof in underground operations; there is also a continuing need for a buffer material that may be positioned between a juxtapositioned hydraulic cement slurry and a polymer slurry, the latter comprising either a polymer-glycol slurry or a polymer-brine slurry, which buffer material is conveniently placed in position and results in a high strength more-or-less permanent buffer zone.

The invention meets these and related needs by providing an easily positioned sealant material which may be used alone or positioned between the polymer slurry and the hydraulic cement slurry and which is compatible with both types of slurries and forms a fluid-tight lasting seal.

The invention is a composition which comprises an acrylamide polymer, hydraulic cement, an alkylene glycol, and water and method of use to seal off underground openings. The cement may be any portland cement, e.g. a class A to G cement as described in API RP 10B, (14th edition), an aluminous or pozzolanic cement, or an expansive cement of the type described in application S.N. 371,755, filed June 1, 1964, now abandoned.

The water present may be as little as 1% and as much as 25% or more by weight of the cement. From 2% to 10% by weight is recommended.

The polymer may be either of the linear or of the limited cross-linked type or it may be a copolymer consisting of a major proportion of acrylamide and a minor proportion of one or more other ethylenic monomers copolymerizable therewith, e.g. vinylbenzylsulfonate or vinylbenzenesulfonate. The polymer is water dispersible and of the type described as "water soluble" in high polymer parlance although it need not form a true solution. The polymer may be prepared by any of a number of known methods. Acrylamide cross-linked with from about 500 to about 5,000 p.p.m. of a diolefinic type cross-linking agent, e.g. methylenebisacrylamide or azobisbutyronitrile, is a preferred polymer to employ. Polymerization may be conducted in an aqueous medium by catalysis employing a free radical promoting type catalyst, e.g. a peroxide such as benzoyl peroxide, or by irradiation such as is carried out by use of a Vandegraaf electron accelerator or cobalt 60. The polymer so made may be separated from the reaction medium by known means. The entire reaction mixture may be used in which instance the amount of water so added is subtracted from subsequently added water. The polymer is preferably employed in the composition of the invention in an amount of between about 0.2 and about 10.0 parts by weight, based on 100 parts of the dry weight of the cement employed.

The glycol may be an alkylene glycol having two or three carbon atoms per molecule, viz, ethylene glycol, propylene glycol, or mixtures thereof, or such alkylene glycol in admixture with one or more polyoxyalkylene glycols wherein the repeating units have two to three carbon atoms, e.g. diethylene glycol, triethylene glycol, or dipropylene glycol.

Figure 2:
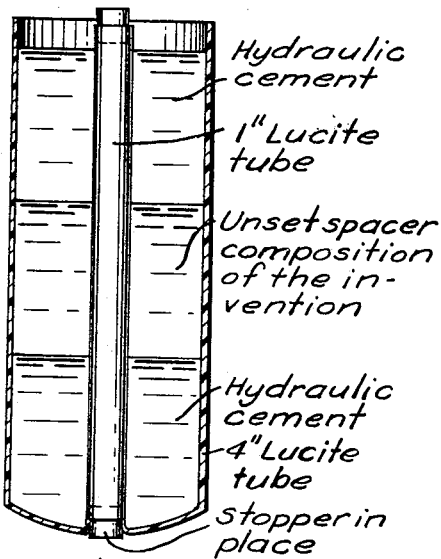
Figure 3:
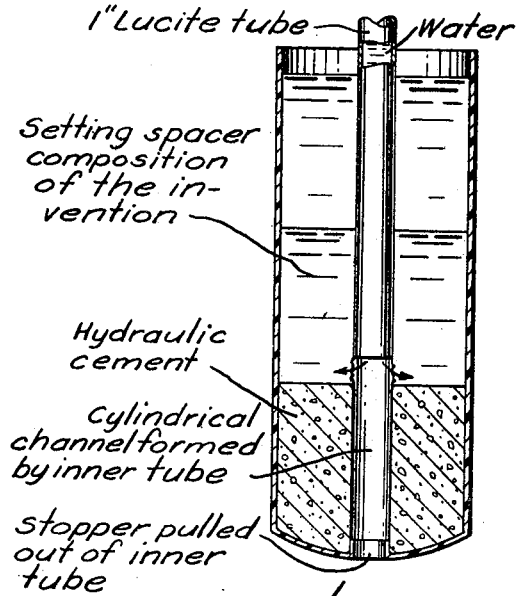
Figure 4:
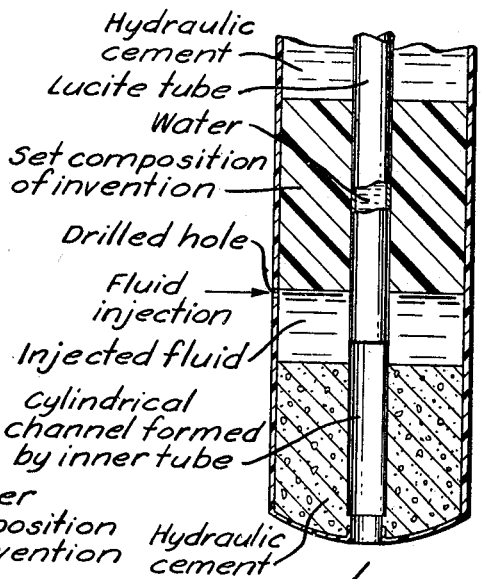

FIGURE 1 of the drawing is a three-phase diagram showing preferable ratios plotted thereon of diethylene glycol, ethylene glycol, and water when all three liquids are employed with the hydraulic cement. FIGURES 2 to 4 of the drawing represent stages of a test which demonstrate the efficacy of the invention.

When the only glycol employed is ethylene glycol or propylene glycol, the amount of water employed may be as little as about 0.25 part but is preferably employed in an amount of at least about 1.0 part per 100 parts by weight of the dry cement present. When the higher molecular weight polyoxyalkylene glycols are also employed, a higher proportion of water to the glycol is recommended. For example, when a larger proportion of the glycol used is a higher molecular weight polyoxyalkylene glycol such as triethylene glycol, at least 2.5 parts of water, or more usually about 10 parts of water, based on 100 parts of the dry weight of the cement is recommended.

The composition as prepared is fluid at any temperature between the freezing and boiling points of the liquid employed and sets to a uniform solid within a conveniently short time. The rate of set or solidification of the composition depends on such conditions as the temperature and on the ratio of ingredients. It is also dependent on the selection and proportion present of the higher molecular weight polyoxyalkylene glycols. For example, the higher the ambient temperature, the faster the set. Also, the higher the percent of polymer present, the faster the set, and the higher the percent of polymer, the greater the strength. Too much polymer, however, must be avoided or the composition will become a putty-like material which is too thick to pump. A viscosity of over about 100 poises is considered too thick for practical purposes. It is recommended that when a higher percent of polymer is employed, at least some higher molecular weight polyoxyalkylene glycol be employed to replace some of the water in a water-ethylene glycol formulation.

When the fluid present consists of only (1) a low-weight alkylene glycol, e.g. ethylene glycol, and (2) water, the higher the ratio of water to glycol, the faster the setting rate of the resulting composition. Contrariwise, the higher the ratio of glycol to water, the slower the setting rate of the composition. The presence of the higher molecular weight polyoxyalkylene glycols, e.g. polyoxyethylene glycol, results in a slower rate of set. Accordingly, where high temperatures are encountered, a higher ratio of glycol and usually preferably also containing a portion of a higher molecular weight glycol such as triethylene glycol or dipropylene glycol may advantageously be employed. From a practical standpoint no more than very small amounts of a glycol of higher molecular weight than triethylene glycol is employed.

Higher ratios of water in the composition in general give faster rates of set and result normally in an earlier set of the composition.

It can be seen that the composition of the invention may be custom made to meet a wide variety of setting conditions.

The total liquid portion of the composition, i.e. the water and the glycol with or without some polyoxyalkylene glycol, is between about 35 and about 100 parts of the liquid per hundred parts of the cement, dry weight. The preferred ratio, however is between about 40 and about 75 parts of total liquid per 100 parts dry weight of cement.

As aforestated, excellent results may be obtained when the fluid employed consists entirely of a low molecular weight glycol, e.g. ethylene glycol and a very small amount of water (which is normally present in the glycol unless specifically removed). However, also as aforestated, some higher glycols and/or additional water may be employed to replace a portion of the lower molecular weight glycol.

Reference to the phase diagram of FIGURE 1, prepared as a result of Examples 1 to 18 set out hereinafter, and tabulated in Table I, shows graphically the preferred volume proportions of ethylene glycol, diethylene glycol, and water, when employed in proportions between 36 and 39.6 parts of total liquid per 100 parts, by weight, of Portland cement and 1 percent by weight of lightly cross-linked polyacrylamide. It will be noted on the graph that no points are shown (and therefore indicated as not operable) wherein the percent of water is less than about 2.5% by volume. The apices of the graph, as indicated thereon, are (A) 100 percent ethylene glycol; (B) 75 percent ethylene glycol, 25% water, and no diethylene glycol; and (C) 75 percent ethylene glycol, 25 percent diethylene glycol, and no water. No point in the diagram contains less than 75 percent ethylene glycol nor more than 25 percent of either water, diethylene glycol, or both water and diethylene glycol. For examlpe, any point along line A-B is composed of from 100 percent to 75 percent ethylene glycol with enough water to make 100 percent of the combined volume of both. Any point along line A-C contains from 100 percent to 75 percent of ethylene glycol with enough diethylene glycol to make 100 percent by volume of both. Any point along line B-C contains 75 percent ethylene glycol and enough of either water, diethylene glycol, or of both water and diethylene glycol sufficient to make 25 percent by volume of one or both, thereby giving a 100 percent total of all three liquids.

A series of tests was run to show the gel time and compressive strength values of the composition of the invention. Each test was run on a mixture containing by weight the following: 100 parts of Class A portland cement, 1 part of lightly cross-linked acrylamide polymer (prepared as described above) and between 36 and 39.6 parts of total liquid. The composition of the liquid was varied. It consisted by volume of 75 to 97.5 percent ethylene glycol, 0 to 20 percent diethylene glycol, and 2.5 to 25 percent water to make 100 percent total volume of liquid. The amount and composition of liquid was varied to give different density slurries having controlled setting times.

Compressive strength values after 24 and 72 hrs. at 140° F., were obtained according to Section 7 of API RP 10B. The identifying number of each test of this series and as set out in the table below is plotted on the graph of FIGURE 1 according to the composition of the liquid employed.

The gel times and the compression values for each of the tests are set out in Table I below.

TABLE I

[Compressive strength in p.s.i. and Gel times According to Sections 7 and 9 of API RP 10B]

| Example No. | Schedule 3 gel time in min. | Compression strength after 24 hrs. | Schedule 6 gel time in min. | Compression strength in p.s.i. after 72 hrs. |
|---|---|---|---|---|
| 1 | 130 | 43 | 33 | 322 |
| 2 | 17 | 420 | 21 | (¹) |
| 3 | 128 | (²) | 43 | 328 |
| 4 | 180 | 41 | 43 | 297 |
| 5 | 300 | (²) | 48 | 231 |
| 6 | (¹) | (²) | 65 | 56 |
| 7 |  | 123 |  | 375 |
| 8 |  | 336 |  | 372 |
| 9 |  | 472 |  | (¹) |
| 10 |  | 450 |  | (¹) |
| 11 |  | 224 |  | (¹) |
| 12 |  | (¹) |  | 416 |
| 13 |  | 336 |  | (¹) |
| 14 |  | 200 |  | (¹) |
| 15 |  | (¹) |  | 473 |
| 16 |  | 86 |  | 299 |
| 17 |  | 114 |  | (¹) |
| 18 |  | 302 |  | (¹) |

¹ Firm gel.
² Not run.

Reference to the above table and to FIGURE 1 shows the relative performance of the composition prepared by employed varying proportions of the three liquids in the practice of the invention.

To show the efficacy of the composition of the invention for use as a sealant, a second series consisting of the following examples was conducted.

The examples of the invention of this series were conducted employing the mixtures by volume of ethylene glycol and water set out in Table II, below. No higher molecular weight polyoxyalkylene glycol was present. In this series of examples, 100 parts by weight of Class A Portland cement are admixed with between 36 and 39.6 parts of the liquid mixture to which there had previously been admixed 1 percent by weight of the cross-linked polyacrylamide of the type employed in the examples above. Compressive tests were run on the set samples of the composition in accordance with API RP 10B, Section 7 at the temperatures shown in Table II after the samples had aged for the period shown in the table.

Reference to Table III shows that the percent of polymer in the glycol-water-cement composition may be increased from about 1 percent to about 6 percent and thereby attain increased strength values in the set composition. There does not appear to be a sharp maximum limit on the amount of polymer to employ, the practical limit being that based on increased viscosity and increased resistance to being pumped at higher concentrations of polymer.

A fourth series of examples illustrating the practice of the invention were run as follows: Examples, of which results are shown in Tables II and III above, were repeated except that the amount of acrylamide polymer employed was maintained at 3.76 percent by weight and the liquid employed contained some higher molecular weight polyoxylalkylene glycol as well as ethylene glycol

TABLE II

| Example No. | Volume percent of liquid mixture | | Gallons of liquid per 100 pounds of cement | Ageing time in hrs. | Compressive values in p.s.i. at— | | |
|---|---|---|---|---|---|---|---|
| | Ethylene glycol | Water | | | 80° F. | 100° F. | 140° F. |
| 19 | 87 | 13 | 5.52 | 24 | | 94 | 234 |
| | | | | 72 | | | 261 |
| 20 | 83.5 | 16.5 | 5.74 | 24 | | 147 | 247 |
| | | | | 72 | | 314 | 280 |
| 21 | 80 | 20 | 6.00 | 24 | 78 | 174 | 205 |
| | | | | 72 | | 290 | 201 |
| 22 | 77 | 23 | 6.25 | 24 | 108 | 168 | 147 |
| | | | | 72 | | 225 | 162 |
| 23 | 74 | 16 | 6.52 | 24 | 115 | 147 | 51 |
| | | | | 72 | | 206 | |
| 24 | 71.5 | 28.5 | 6.83 | 24 | 112 | 93 | |
| | | | | 72 | | 131 | |
| 25 | 67 | 33 | 7.20 | 72 | | 48 | |

Reference to Table II shows that a low molecular weight alkylene glycol and water mixture admixed with an hydraulic cement and an acrylamide type polymer produces a fluid composition which, when set, has high compressive strength values over a practical temperature range. It also shows a downward trend in compressive strength values when the percent water in the liquid is increased up to 33 percent of water by volume of the total liquid.

and water. Compressive strength values were obtained on the set compositions as in the examples above. The pertinent facts and values obtained are shown in Table IV.

TABLE IV

| Example No. | Volume percent of liquid mixture* | | | Weight percent of polymer | Ageing time in hours | Compression values in p.s.i. at 140° F. |
|---|---|---|---|---|---|---|
| | Ethylene glycol | Diethylene glycol | Water | | | |
| 30 | 93 | 2 | 5 | 3.76 | 24 | 456 |
| 31 | 90 | 5 | 5 | 3.76 | 24 | 408 |
| 32 | 88 | 7 | 5 | 3.76 | 24 | 348 |
| 33 | 83 | 12 | 5 | 3.76 | 24 | 231 |
| 34 | 78.5 | 16.5 | 5 | 3.76 | 24 | 200 |
| 35 | 76 | 19 | 5 | 3.76 | 24 | 134 |
| | | | | | 72 | 1,001 |

*5.02 gallons of liquid per 100 pounds of cement were used in these tests.

A third series of examples of the invention were run, similar to those of which salient facts are set out in Table II, except that the amount of the acrylamide type polymer employed per 100 parts by weight of the hydraulic cement, was varied. Compressive strength values were run as in the above examples. The proportions of ethylene glycol and water, the weight percent of polymer, ageing time, and compressive strength values are shown in Table III.

TABLE III

| Ex. No. | Volume percent of liquid mixture* | | Weight percent of polymer | Ageing time in hrs. | Compression values in p.s.i. at— | |
|---|---|---|---|---|---|---|
| | Ethylene glycol | Water | | | 100° F. | 140° F. |
| 26 | 95 | 5 | 1.41 | 24 | 19 | 234 |
| | | | | 72 | | 215 |
| 27 | 95 | 5 | 1.88 | 24 | 34 | 234 |
| | | | | 72 | | 279 |
| 28 | 95 | 5 | 3.76 | 24 | 123 | 440 |
| | | | | 72 | | 366 |
| 29 | 95 | 5 | 5.64 | 24 | 251 | 726 |
| | | | | 72 | | 1,115 |

*5.02 gallons of liquid per 100 pounds of cement were used in these tests.

After 24 hours ageing, the composition tabulated in Table IV shows gradual declining compressive strength values as the percent of the higher molecular weight diethylene glycol is increased. However, after the longer 72 hours ageing time, a very high compression strength value can be obtained when employing as high as about 20 percent by volume of the higher polyglycol with 5 percent water and balance (to make 100 percent) of ethylene glycol.

EXAMPLE 36

Two compositions hereinafter designated X and Y were prepared, composition X in accordance with application S.N. 486,530 and composition Y in accordance with the invention.

Composition X was prepared as follows:

A polymer was first made by polymerizing acrylamide with 4600 parts of methyelnebisacrylamide per million parts of the acrylamide, catalyzed by a free radical promoting peroxide type catalyst in water. Sixty parts by weight of the polymer so prepared were admixed with 175 parts by weight of $BaSO_4$ and 101.8 parts by weight of ethylene glycol. The mixture so made was poured into an upright cylindrical transparent bottle, filling it about ⅓ of its capacity.

Composition Y (illustrative of the invention) was prepared by admixing, by weight, one part of a second portion of the polymer prepared as described above with 453.5 parts of a mixture of 91 percent by volume ethylene glycol (417 parts by weight) and 9 percent by volume of water (36.5 parts by weight). The resulting slurry was admixed with 100 parts of API Class A portland cement. The cement slurry so made was promptly poured on top of composition X in the cylindrical bottle, thereby filling it to about ⅔ of its height.

Immediately thereafter a second portion of composition X was poured on top of composition Y in the bottle, substantially filling it to the top.

The resulting sandwich-like sealant was allowed to set for 24 hours at 140° F. during which the layers all set to a hard solid. Upon examining the resulting solid it was observed to be firm and strong showing a pronounced adhesion between the upper and lower X layers and the Y layer located between the X layers. There was no indication of zones of weakness at the interfaces.

EXAMPLE 37

The procedure of Example 36 was substantially repeated but wherein the chemical sealant was a composition consisting essentially of the acrylamide polymer-brine composition prepared according to Series One of application S.N. 371,665, filed June 1, 1964 now U.S. Patent 3,306,870. Following setting of both the polymer-brine composition and the polymer-cement-glycol-water composition, an excellent bond was formed at the interface with no observable weakness.

EXAMPLE 38

To show that the composition of the invention is compatible with a conventional aqueous cement slurry when emplaced and set face-to-face whereas that prepared according to S.N. 486,530 is not, this example was conducted as follows:

A composition, X', was prepared which was similar to composition X of Example 36 employing 5 lbs. by weight of the cross-linked acrylamide polymer (prepared as described above) per gallon (about 9.3 lbs.) of ethylene glycol. The slurry so made was put into a bottle of the nature of that used in Example 36, filling it to about ⅓ of its height.

A second composition consisting of a conventional hydraulic cement slurry, composed of 46 parts of water per hundred parts of API Class A portland cement, was prepared and transferred into the glass bottle on top of the X' composition, thereby filling the bottle to about ⅔ of its height.

A composition Y' according to the invention was prepared essentially according to the procedure followed in preparing composition Y of Example 36 and placed on top of the hydraulic cement composition in the bottle, thereby substantially filling it.

The resulting three-layer slurry was allowed to set for two hours and then examined. The interface between the cement slurry and the X' composition (not in accordance with the invention) showed an intermingling and contamination of the hydraulic cement by the polymer of the X' slurry thereby causing a zone of weakness.

On the contrary, the interface between the hydraulic cement slurry and composition Y' (according to the invention) was clean, forming an adherent bond and showing no indications of weakness.

EXAMPLE 39

This example was conducted to simulate a pipe or tube in a wellbore wherein an annular seal is sought to be provided between the pipe or tube and a casing of the wellbore or more commonly the wellbore wall itself. A model apparatus resembling a pipe or tube positioned in a wellbore was prepared. It consisted of a 4" inside diameter Lucite tube closed at the bottom end and a 1" outside diameter Lucite tube (provided with a removable inserted stopper in the bottom end) which was coated with a lubricating grease and centered inside of the larger 4" tube.

An aqueous hydraulic cement slurry consisting by weight of 33 parts of water per hundred parts of portland cement was prepared. One portion (about 750 milliliters) thereof was placed in the lower part of the annulus formed between the concentric two Lucite tubes.

About 1400 milliliters of the polymer-cement-glycol-water composition of the invention was then prepared by admixing the ingredients in a Waring blender for about 30 seconds. The liquid portion consisted by volume of:

7.5% diethylene glycol,
90.0% ethylene glycol,
2.5% water.

4.7 gallons of the above liquid were admixed with 100 pounds of Class A portland cement.

This composition, to which reference may be made as the spacer composition, was poured into the annulus of the apparatus between the Lucite tubes.

A second portion of the aqueous portland cement prepared as described above, amounting to 750 milliliters, was then poured into the annulus between the Lucite tubes on top of the spacer slurry of the invention.

The tube assembly containing the aqueous composition was allowed to stand for 18 hours during which the hydraulic cement (top and bottom layers) set to a hard solid. The polymer-containing spacer layer of the invention had not at that time set. FIGURE 2 of the drawing represents the tube assembly at this stage.

The inner or 1" tube which had been provided with lubrication on the outside was then pulled upward until its lower open end was opposite the unset spacer composition. The stopper in the lower end of the 1" tube, having been embedded in set hydraulic cement, pulled out and remained embedded when the inner tube was pulled upward. The inner tube was thereafter filled with water, the water in the tube thereby being brought into contact with the unset spacer composition. Such contact began to effectuate gelling or setting up of the composition. The inner tube thereafter was gradually raised, while being maintained full of water, thereby bringing the entire height of the composition of the invention into contact with the water which accelerated the setting up process. As the spacer composition proceeded to set, it swelled, thereby exerting pressure on the lateral confining wall of the tube. Measurement about the girth of the original 4" tube, at the location of the spacer composition showed the circumference thereof to have been increased 1/16". FIGURE 3 of the drawing represents the tube assembly at this stage. The assembly was then placed in a 140° F. temperature bath to accelerate the setting of the spacer composition. After the spacer composition had partially gelled or set (due largely to lack of complete contact thereof with water) the assembly was removed from the bath.

At this stage, a small hole was drilled into the side of the outer Lucite tube at the level of the spacer composition. Since the spacer composition was not fully set at this time, some of the interior portion thereof drained out through the hole leaving a void therein. Water under pressure was then injected through the hole into the void left by the escaped spacer composition. The purpose of injecting the water was to simulate encroaching ground water into and along the face of a wellbore. Upon contact with the water, the unset spacer composition set to a firm solid, during which it continued to expand, creating sufficient force through expansion to move the upper cement plug upwardly, by the accompanying swelling action, the spacer composition being pressed up about the portland cement, thereby closing all passage of liquid past or through the upper cement plug. FIGURE 4 shows the tube assembly at this state. Thereafter, the water was drained from the annulus of the tube assembly and air under pressure injected through the hole into the void. The purpose of the air was to simulate gas encroaching into a wellbore. No air could be forced upwardly through the cement plug at the pressure employed showing that the passageway had been effectively sealed against the passage of gas.

EXAMPLE 40

This example demonstrates the practice of the invention wherein a wellbore is sealed off. A wellbore about 300 feet deep and about 8 inches in diameter was selected to be sealed. The steps of treatment were:

(1) 18,000 pounds of an economy type cement comprising about half pozzolana cement and half Class A portland cement were admixed with water to make a slurry 46 parts of water per hundred parts of the cement mixture. This aqueous slurry referred to hereinafter as pozzolana cement, was pumped down the wellbore.

(2) Thereafter a spacer slurry of the invention having the same composition as that employed in Example 39 was prepared and 50 gallons thereof pumped down the well coming to rest on the pozzolana cement.

(3) Then 200 gallons of a chemical seal slurry (as described in S.N. 486,530) prepared according to the procedure followed in the preparation of slurry X in Example 36, was pumped down the wellbore on top of the spacer slurry of the invention.

(4) A second portion, of the spacer slurry of the invention, of about the same volume as that earlier injected down the well, was injected behind the chemical seal slurry.

(5) Thereafter an hydraulic cement slurry consisting of 46 parts water to 100 parts of portland cement was prepared and pumped down the well. A rubber plug of the type used to follow cement slurries in conventional practice was positioned in the wellbore above the last injected cement slurry.

(6) Drilling mud, consisting substantially of fine clay suspended in water, was pumped down the wellbore behind the slurry as a displacing fluid, thereby forcing all the injected fluids downwardly so that each was in contact with the preceding one and the pozzolana cement firmly forced against the bottom of the wellbore.

Figure 5:
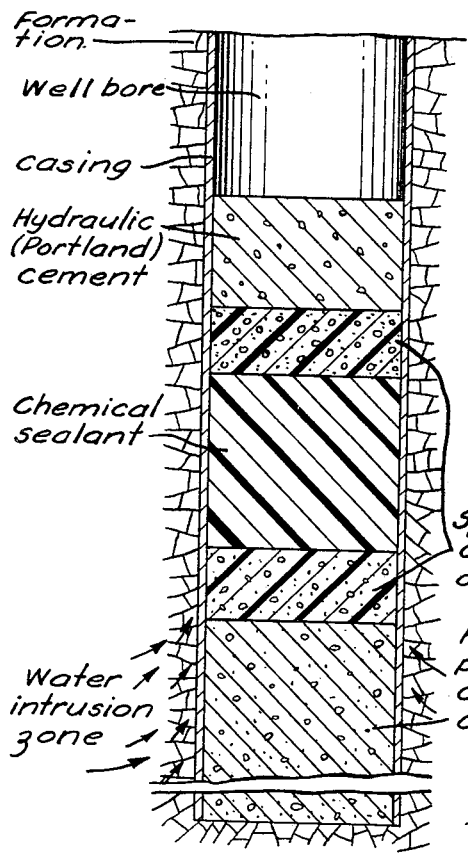

FIGURE 5 is a diagram of the wellbore which was plugged off in accordance with Example 40 showing the emplaced sealant combination wherein a chemical seal according to S.N. 486,530 (designated "chemical sealant") is emplaced in a wellbore adjacent to which on both the upper and lower sides thereof, is emplaced the composition of the invention which provides a spacer composition between the chemical sealant and both an earlier and later emplaced hydraulic cement slurries.

The examples demonstrate the efficacy of the practice of the invention to close off passageways against the passage of water and aqueous solutions.

Having described the invention, what we claim and desire to protect by letters patent is:

1. The composition of matter which may be emplaced in slurry form between and in contact with aqueous polymeric slurries and aqueous cement slurries and which sets to a solid, resistant to the passage of fluids, said composition comprising an intimate admixture of components A, B, C, and D wherein: A is either (1) an alkylene glycol containing from 2 to 3 carbon atoms per molecule or (2) mixtures of ingredient (1) and a higher molecular weight glycol selected from the class consisting of diethylene glycol, triethylene glycol, and dipropylene glycol of which ingredient (1) comprises at least 75 percent by volume of the total glycols present; B is water; C is a water-swellable water-dispersible polymer selected from the class consisting of linear polyacrylamide, copolymers of a major proportion of acrylamide and a minor proportion of an ethylenically unsaturated monomer copolymerizable therewith, and cross-linked acrylamide polymers; D is an hydraulic cement selected from the class consisting of portland, aluminous, pozzolanic, and expansive sulfoaluminate-containing cement, and mixtures thereof, in proportions by weight of each component of: between about 40 and 100 parts of component A; between about 1 and 25 parts of component B; between about 0.5 and 6.0 parts of component C and 100 parts of component D.

2. The composition of claim 1 wherein component A is ethylene glycol.

3. The composition of claim 1 wherein the polymer is that prepared by polymerizing acrylamide with between about 500 and about 5,000 parts by weight of a diolefinic cross-linking agent per million parts of acrylamide in an aqueous reaction medium in the presence of an effective amount of a free-radical promoting catalyst.

4. The composition of claim 1 wherein the acrylamide polymer is cross-linked with between about 500 and 5,000 parts by weight of a diolefinic agent reactive therewith by subjecting the monomeric mixture to sufficient irradiation to effect the desired cross-linking.

5. The composition of claim 1 wherein the cross-linking agent employed in the monomeric mixture is methylene-bisacrylamide and the catalyst employed is a peroxide.

6. The method of sealing off an underground opening to inhibit encroachment therein and passage of ground waters therethrough which comprises injecting into the opening the composition of claim 1.

7. The method according to claim 6 wherein an hydraulic cement slurry is emplaced in the opening in juxtaposition to said composition.

8. The method according to claim 6 wherein a chemical seal consisting of a water-swellable polymer dispersed in a liquid selected from the class consisting of brine, glycol, and mixtures of water and glycol is emplaced in the opening in juxtaposition to said composition.

9. The method according to claim 6 wherein both an aqueous hydraulic cement slurry and a chemical seal consisting of a water-swellable polymer dispersed in a liquid selected from the class consisting of brine, glycol, and mixtures of water and glycol are emplaced in the opening in juxtaposition to said composition.

10. The method according to claim 9 wherein the emplacement of each of the aqueous hydraulic slurry, the chemical seal, and said composition is repeated to provide a multilayer consisting of substantially vertical successive layers thereof.

References Cited

UNITED STATES PATENTS

| | | |
|---|---|---|
| 3,163,619 | 12/1964 | Sheats et al. |
| 3,238,141 | 3/1966 | Gatza. |
| 3,239,479 | 3/1966 | Roenicke et al. |
| 3,306,870 | 2/1967 | Eilers et al. |
| 3,094,501 | 6/1963 | Wahl et al. _____ 260—29.6 |
| 3,353,601 | 11/1967 | Dollarhide et al. _____ 166—33 |

MURRAY TILLMAN, Primary Examiner

W. J. BRIGGS, SR., Assistant Examiner

U.S. Cl. X.R.

166—293, 295; 260—29.7, 33.4

PO-1050
(5/69)

UNITED STATES PATENT OFFICE
CERTIFICATE OF CORRECTION

Patent No. 3,493,529          Dated February 3, 1970

Inventor(s) Ralph L. Krottinger, Samuel A. Pence and Louis H. Eiler

It is certified that error appears in the above-identified patent and that said Letters Patent are hereby corrected as shown below:

In Col. 4, near line 70, "[1]Firm gel." should be deleted and in its place insert --[1]Not run.--; and "[2]Not run." should be deleted and in its place insert --[2]Firm gel.--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents